Sept. 20, 1960 D. T. AYERS, JR 2,953,120
BOOSTER BRAKE MECHANISM
Filed July 9, 1958 3 Sheets-Sheet 1

INVENTOR.
DAVID T. AYERS JR.
BY
John F. Phillips
ATTORNEY

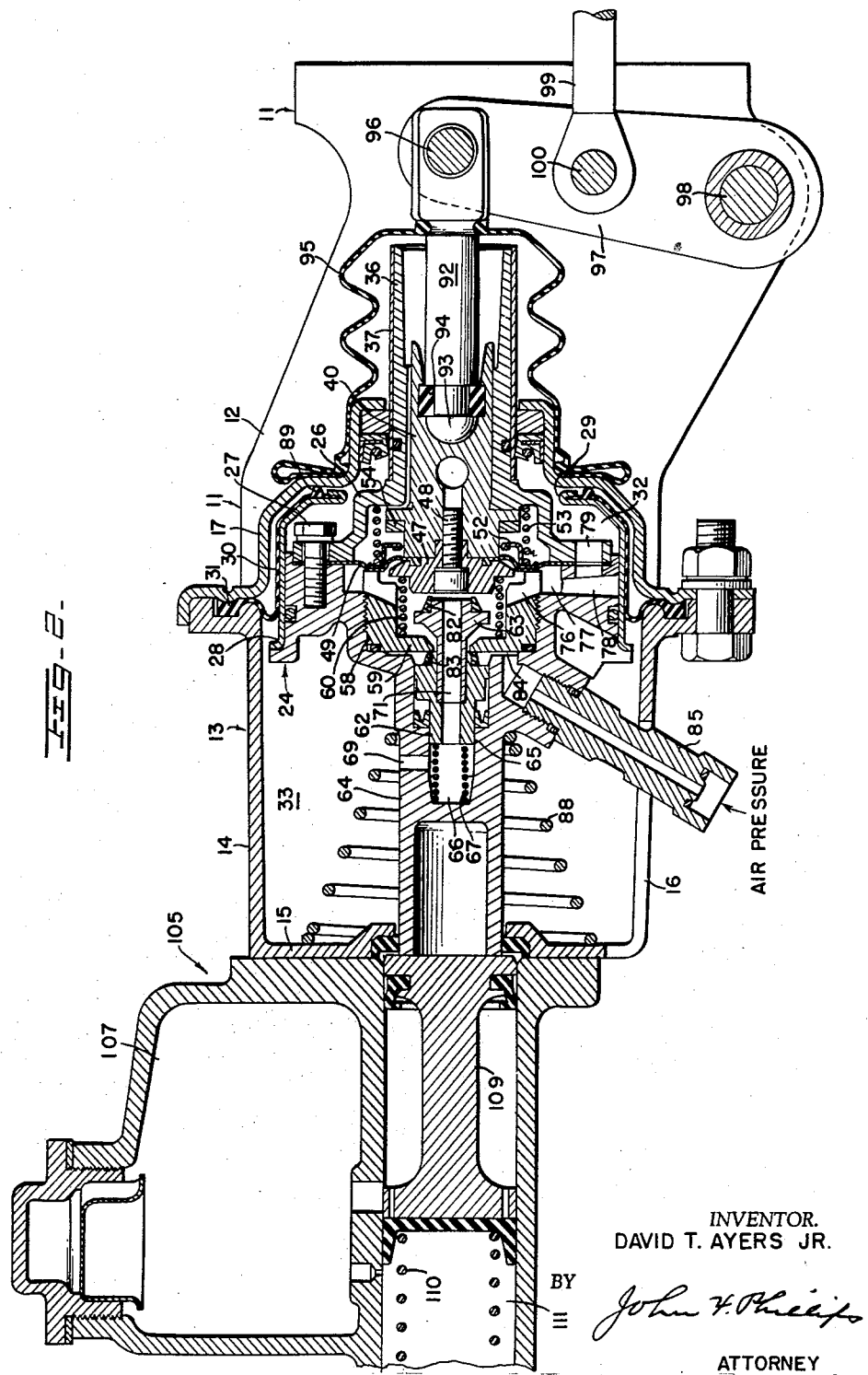

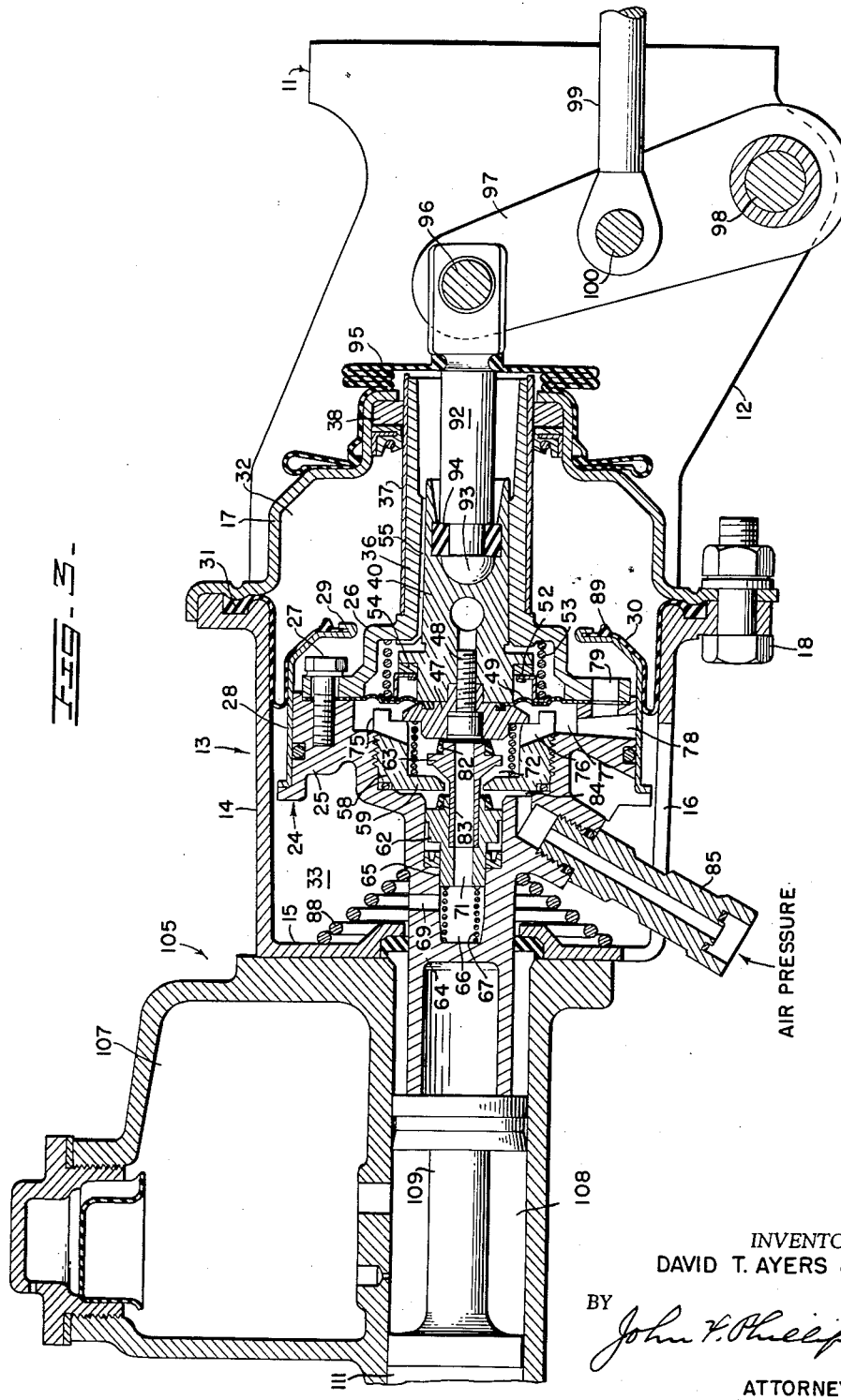

United States Patent Office 2,953,120
Patented Sept. 20, 1960

2,953,120

BOOSTER BRAKE MECHANISM

David T. Ayers, Jr., Birmingham, Mich., assignor to Kelsey-Hayes Company, Detroit, Mich., a corporation of Delaware Filed July 9, 1958, Ser. No. 747,424

9 Claims. (Cl. 121—41)

This invention relates to a booster brake mechanism, and more particularly to a booster motor mechanism adapted for use in operating the master cylinder of a motor vehicle.

An important object of the invention is to provide a novel type of brake booster motor mechanism which is particularly adapted for use with a conventional vehicle master cylinder, thus eliminating the necessity for the making of special types of master cylinders for use with the mechanism.

A further object is to provide such a motor mechanism wherein all of the forces through the mechanism and master cylinder plunger are coaxial, thus eliminating any mis-alinement of the parts and any friction which might be due to such mis-alinement.

A further object is to provide such a mechanism which is particularly economical to manufacture and assemble and which eliminates to the maximum extent the use of friction creating seals between relatively movable parts, thus making for a particularly smooth operation of the motor mechanism with a resultant smooth pedal operation through which the mechanism is controlled.

A further object is to provide a mechanism of this type which utilizes a rolling diaphragm as a part of the pressure responsive unit of the motor and which diaphragm is mounted in a novel manner for efficiency and ease in assembling and servicing.

A further object is to provide a mechanism of this character wherein, upon initial energization of the booster motor by operation of the brake pedal, a first stage of reaction is transmitted to the brake pedal, and to provide novel means operative when differential pressures in the motor have been built up to a predetermined extent to transmit to the brake pedal a higher degree of reaction against movement of the pedal, thus providing the pedal with accurate "feel" in the operation thereof.

A further object is to provide a motor mechanism of this type, which is particularly adapted for use with super-atmospheric pressure as the source of differential pressure for operating the motor mechanism.

Other objects and advantages of the invention will become apparent during the course of the following description.

In the drawings I have shown one embodiment of the invention. In this showing:

Figure 2 is an enlarged fragmentary axial sectional view through the motor mechanism and a portion of the master cylinder, the parts being shown in normal off positions; and Figure 3 is a similar view showing the parts in operative brake-applying positions.

Figure 1:
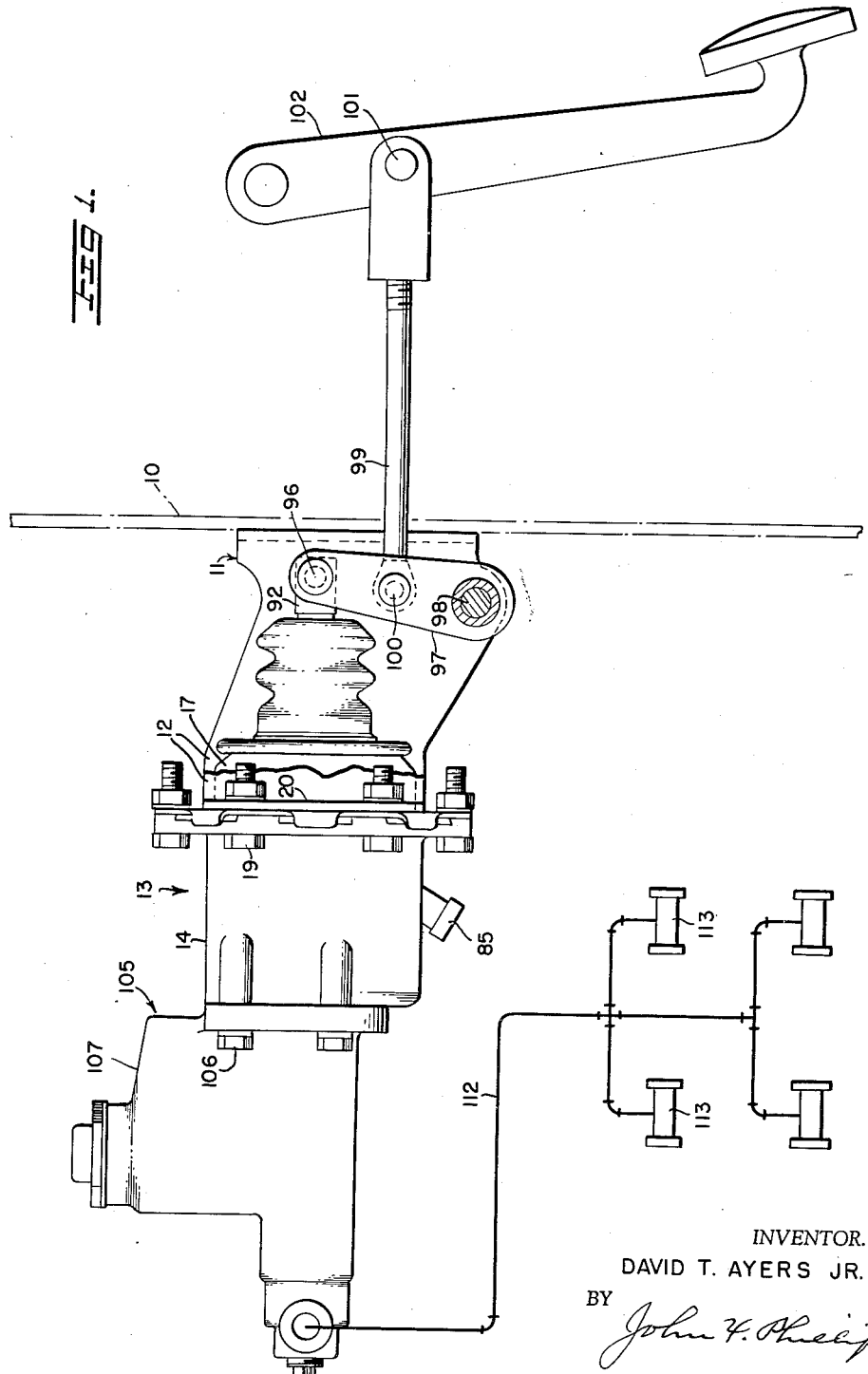
Figure 1 is a side elevation of the mechanism, parts being broken away and the fire wall of the motor vehicle being shown in broken lines, the wheel cylinders and the connections thereof to the master cylinder being diagrammatically indicated.

Referring to the drawings, the numeral 10 designates the fire wall of a motor vehicle against the forward face of which is secured in any suitable manner a U-shaped bracket 11 having forwardly extending substantially parallel walls 12. These walls support forwardly thereof a booster motor indicated as a whole by the numeral 13.

The motor 13 comprises a main forward housing member 14 which is cylindrical in cross section and provided with a forward end wall 15, and the bottom of the housing 14 is longitudinally slotted as at 16 for a purpose to be described. The motor further comprises a rear housing member 17. The two housing members are peripherally flanged and bolted together as at 18. At opposite sides of the motor, the flanges of the housing members are also bolted as at 19 to outstanding flanges 20 formed on the bracket walls 12.

The motor 13 further comprises a pressure responsive unit indicated as a whole by the numeral 24 and comprising preferably die-cast body sections 25 and 26 secured together as at 27. Pressed on the cylindrical outer surface of the body section 25 is an annular preferably pressed-steel member 28 which extends rearwardly of the body member 25, such extended portion having a radially inward extremity crimped over as at 29 to clamp in position the inner periphery of a rolling diaphragm 30. The outer periphery of such diaphragm is beaded as at 31 and clamped between the flanges of the housing members 14 and 17. The pressure responsive unit including the diaphragm 30 divides the motor to form a variable pressure chamber 32 and an atmospheric chamber 33, the latter of which is open to the atmosphere through the slot 16.

The body member 26 is provided with a rearwardly extending sleeve portion 36 preferably covered with a stainless steel tube 37 slidable through a combined bearing and sealing unit 38 carried by the rear motor housing 17, as shown in Figures 2 and 3.

A manually operable member 40 is axially slidable in the sleeve portion 36 and has a cap member 47 secured to the inner end thereof by a screw 48. This cap member serves to clamp against the inner end of the member 40 the inner periphery of a diaphragm 49. The outer periphery of such diaphragm is clamped between the radially outer portions of the body members 25 and 26. A reaction washer 52 engages against the diaphragm 49 and the washer and diaphragm are biased toward the left in Figures 2 and 3 by a spring 53 to normally assume the position shown in Figure 2. The member 40 carries a rubber or similar bumper 54 against which the inner flange of the reaction washer 52 is engageable when the motor is energized as shown in Figure 3, these elements being normally spaced in the off positions of the parts as shown in Figure 2. The sleeve portion 36 forms a bearing in which the member 40 slides, and such bearing is grooved as at 55 to vent the chamber in which the spring 53 is arranged.

A nut 58 is threaded in the body member 25 and is provided with an in-turned flange 59 the inner portion of one side of which forms a valve seat as further described below. A spring 60 engages at opposite ends against the flange 59 and cap 47 to urge the latter and the elements connected thereto toward the right as viewed in Figures 2 and 3.

A valve unit comprising elements 62 and 63 is mounted to slide in the body member 24. This body member is provided with a forwardly extending axial portion 64 having a bore 65 in which the forward end of the member 62 is slidable. The forward end of this bore forms a chamber 66 in which is arranged a spring 67 biasing the members 62 and 63 to the right as shown in Figures 2 and 3. The chamber 66 communicates through a lateral port 69 with the chamber 33. The members 62 and 63 are provided with an axial passage 71 opening at its forward end into the chamber 66 and at its rear end normally opening into a control chamber 72 formed rearwardly of the flange 59 and in which the spring 60 is arranged.

The nut 58 is provided with an annular flange 75 against which the diaphragm 49 normally seats (Figure 2). This flange is radially grooved as at 76 so that the chamber 72 normally communicates with a radially outer chamber 77, which chamber, in turn, communicates through passages 78 and 79 with the chamber 32.

The axially slidable member 63 is provided with a rubber or similar valve 82 projecting slightly beyond the rear end of the member 63. The cap 47 forms a valve seat normally disengaged from, but engageable with, the valve 82 as described below. The member 62 carries a similar rubber valve 83 normally engaged with the forward face of the flange 59.

The space surrounding the valve 83 forms a pressure chamber 84 communicating with the axial passage of a connector 85 extending through the slot 16. The outer end of this connector is attached to a flexible hose leading to a source of superatmospheric pressure.

All of the parts of the motor mechanism are shown in normal positions in Figure 2. The springs, 53, 60 and 67 bias to normal positions the various parts associated with the valve mechanism for the motor. The pressure responsive unit as a whole is provided with a return spring 88, and movement of the pressure responsive unit to off position is limited by engagement of an annular bumper 89, formed on the diaphragm 30, with a wall portion of the housing section 17.

Movement is imparted to the axially movable member 40 by a push rod 92 having a hemispherical end 93 and maintained in position by a rubber ring 94. A boot 95 is connected between the push rod 92 and the motor housing member 17.

The rod 92 is pivoted as at 96 to the upper end of a lever 97, the lower end of which is pivoted as at 98 to the bracket walls 12. A pedal operated push rod 99 is pivoted as at 100 to the lever 97 intermediate its ends. The rear end of the rod 99 is pivoted as at 101 (Figure 1) to a pedal lever 102 of conventional type.

A conventional master cylinder 105 is secured to the forward portion of the motor housing 14 as at 106 (Figure 1). This master cylinder comprises a conventional reservoir 107 and a conventional master cylinder bore 108 in which is slidable the usual plunger 109. The rear end of this plunger has abutting relationship to the axial extension 64 to be actuated thereby. The plunger 109 is biased rearwardly by the usual spring 110, the forward end of which engages a conventional residual pressure valve. The pressure end of the cylinder bore 108 forms a chamber 111 communicating through lines 112 with the usual wheel cylinders 113.

*Operation*

The parts normally occupy the positions shown in Figure 2, the variable pressure motor chamber 32 communicating with the atmosphere through the various passages and chambers 79, 78, 76, 72, 71, 66 and 33. The high pressure or application valve 83 will be closed, and accordingly super-atmosphere pressure cannot pass beyond the chamber 84. The brake is operated by depressing the pedal 102 to transmit movement through rod 99, lever 97 and rod 92 to the axially movable member 40. Such movement engages the forward face of the cap 47 with the valve 82, thus closing the atmospheric passage 71 to the chamber 72 and hence to the motor chamber 32. The edge of the valve 82 projects very slightly beyond the adjacent end of the member 63, which member, when the valve 82 is closed and slightly distorted, will engage the member 47 to provide a solid connection between the members 63 and 47 without damaging distortion of the valve 82.

Slight further movement of the brake pedal will cause the cap 47 to effect movement of the members 62 and 63 toward the left from the position shown in Figure 2 to the position shown in Figure 3, the high pressure chamber 84 thereupon supplying air under pressure to the chamber 72 and through the various passages described to the motor chamber 32. The initial cracking of the valve 83, therefore, builds up pressure in the motor chamber 32, and the pressure responsive unit 24 will start to move toward the left from the position shown in Figure 2 to effect a fluid displacing movement of the plunger 109 to start to apply the brakes. It will be apparent that super-atmospheric pressure thus admitted into the chamber 72 acts to the right against the valve seat face of the cap 47 radially outwardly of the valve 82. This pressure reacts through the member 40 and the elements connected thereto to oppose valve operating movement of the brake pedal 102.

In this connection, it is pointed out that initial movement of the brake pedal takes place solely against resistance of the spring 60 until movement is imparted to the members 62 and 63, whereupon the slight additional resistance offered by the spring 67 is encountered. The seal surrounding the forward end of the member 62, which is small, offers only slight and negligible resistance to the valve operating member referred to. Thus a soft pedal is provided, and a first stage of reaction, which is relatively low, is transmitted to the brake pedal as soon as super-atmospheric pressure is supplied to the chamber 72, and such reaction will be proportional to the pressure in the chamber 72.

Operation of the master cylinder plunger 109 in the manner described displaced fluid through the lines 112 to the brake cylinders 113 to move the brake shoes into engagement with the drums.

It will be apparent that the reaction pressures present in the chamber 72 during initial brake operation will be present also in the chamber 77 and will act rearwardly against the diaphragm 49. The spring 53, however, resists deflection of the diaphragm 49 until pressures in the chamber 77 increase to a predetermined point, for example from 40 to 70 p.s.i. At such point, the spring 53 will be overcome and the internal flange of the washer 52 will engage the bumper 54. The area of the diaphragm 49, which is then subjected to pressure in the chamber 77 will provide a second and higher stage of reaction opposing movement of the member 40 and hence movement of the brake pedal.

At any time movement of the brake pedal is arrested, the members 62 and 63 become stationary and a very slight additional movement of the pressure responsive unit will engage the valve seat flange 59 with the valve 83, thus restoring the valve parts to lap position.

Upon the releasing of the brake pedal, the spring 60 will move the cap 47 toward the right, and the members 62 and 63 will follow such movement by virtue of the force applied by the return spring 67 until the valve 83 engages the flange 59. Further movement of the cap 47 to the right will then open the valve 82 and thus restore communication between the chamber 72 and the atmospheric passage 71 to exhaust pressure from the motor chamber 32 into the atmospheric motor chamber 33. The return spring 88 will return the pressure responsive unit bodily to its normal off position, which position is reached when the diaphragm bumper 89 engages the motor housing 17 as shown in Figure 2. Of course, the exhausting of pressure from the chamber 72 relieves the pressure acting against the diaphragm 49, and the spring 53 will return the diaphragm to its normal position in engagement with the flange 75 as shown in Figure 2.

The lever 97 and push rod 99 are used in conjunction with a standard 5:1 ratio brake pedal. The unit can be operated by directly connecting the rod 92 to the brake pedal by using a pedal with a ratio of 3:1 to 3.5:1. The particular means for pedal-operating the rod 92 therefore is unimportant.

From the foregoing, it will be apparent that the present construction provides for a direct in-line operation of the motor and the valve parts thereof and the master cylinder plunger, and permits the use of a conventional master cylinder without change. The motor and the master cylinder are fixed as a unit and bodily supported by the bracket 11. All valve and motor forces are transmitted axially of the motor, thus eliminating any tendency for binding to occur between any of the parts. Particular attention also is invited to the fact that the use of friction-creating seals associated with manually operable parts is substantially completely eliminated, there being only one such seal employed surrounding the forward end of the member 62. This fact provides for a highly accurate and very smooth operation of the parts without any false or lumpy resistances to movements of the pedal operated parts.

The use of the pressed-metal diaphragm support 28 is advantageous since it facilitates the assembly of the parts and thus effects an appreciable reduction in the cost of manufacture. All of the valve parts and associated elements are assembled with respect to the body members 25 and 26, whereupon such members are secured together. It is thereupon a simple matter to apply the diaphragm support 28 and secure the bead 31 of the diaphragm between the motor housing sections 14 and 17. It also will be apparent that if servicing of any of the internal parts of the pressure responsive unit becomes necessary, the diaphragm support 28 readily can be removed bodily from the pressure responsive unit to facilitate disassembly of the latter.

In the event of a failure of power in the motor, pedal operation of the member 40 will effect rearward movement of the member 63 and the radially outwardly projecting portion of the latter will engage the flange 59, thus providing for the direct transmission of manual forces through the axial extension 64 and thus to the plunger 109.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster motor mechanism comprising a casing having a pressure responsive unit therein forming therewith a variable pressure chamber, a high pressure chamber in said variable pressure unit connected to a source of superatmospheric pressure, a control chamber in said pressure responsive unit communicating with said variable pressure chamber, a valve unit axially slidable in said pressure responsive unit, a first valve carried by said valve unit and normally closing communication between said high pressure chamber and said control chamber, a second valve carried by said valve unit and normally opening communication between said control chamber and the atmosphere, a manually operable unit coaxial with said valve unit and having a valve seat movable into engagement with said second valve to close it and move said valve unit to open said first valve to supply super-atmospheric pressure to said control chamber, said second valve being annular and said seat outwardly of said second valve having a surface exposed to said control chamber to react against valve operating movement of said manually operable unit when super-atmospheric pressure is present in said control chamber, and means responsive to relatively high pressures in asid control chamber for transmitting such pressures to said manually operable unit to further react against valve operating movement of the latter.

2. A booster motor mechanism comprising a casing having a pressure responsive unit therein forming therewith a variable pressure chamber, a high pressure chamber in said variable pressure unit connected to a source of superatmospheric pressure, a control chamber in said pressure responsive unit communicating with said variable pressure chamber, a valve unit axially slidable in said pressure responsive unit, a first valve carried by said valve unit and normally closing communication between said high pressure chamber and said control chamber, a second valve carried by said valve unit and normally opening communication between said control chamber and the atmosphere, a manually operable unit coaxial with said valve unit and having a valve seat movable into engagement with said second valve to close it and move said valve unit to open said first valve to supply super-atmospheric pressure to said control chamber, said second valve being annular and said seat outwardly of said second valve having a surface exposed to said control chamber to react against valve operating movement of said manually operable unit when super-atmospheric pressure is present in said control chamber, a pressure responsive element having a face exposed to pressure in said control chamber, and means biasing said pressure responsive element to a normal position in engagement with a portion of said pressure responsive unit when said second valve is open, a portion of said pressure responsive element being engageable with said manually operable unit to further react against movement of the latter when superatmospheric pressure in said control chamber is high enough to overcome said biasing means.

3. A booster motor mechanism comprising a casing having a pressure responsive unit therein forming therewith a variable pressure chamber, a high pressure chamber in said variable pressure unit connected to a source of super-atmospheric pressure, a control chamber in said pressure responsive unit communicating with said variable pressure chamber, a valve unit axially slidable in said pressure responsive unit, a first valve carried by said valve unit and normally closing communication between said high pressure chamber and said control chamber, a second valve carried by said valve unit and normally opening communication between said control chamber and the atmosphere, a manually operable unit coaxial with said valve unit and having a valve seat movable into engagement with said second valve to close it and move said valve unit to open said first valve to supply super-atmospheric pressure to said control chamber, said second valve being annular and said seat outwardly of said second valve having a surface exposed to said control chamber to react against valve operating movement of said manually operable unit when super-atmospheric pressure is present in said control chamber, a diaphragm having an inner periphery fixed to said manually operable unit and an outer periphery fixed to said pressure responsive unit and having a face exposed to said control chamber, a spring biasing said diaphragm toward said control chamber to a normal position engaging a portion of said pressure responsive unit when atmospheric pressure is present in said control chamber, and a reaction element fixed to said diaphragm and having a portion spaced from a portion of said manually operable unit and movable into engagement therewith to react against valve operating movement thereof when pressure in said control chamber rises to the predetermined point necessary to overcome said biasing means.

4. A booster motor mechanism comprising a casing having a pressure responsive unit therein forming therewith a variable pressure chamber, a high pressure chamber in said pressure responsive unit connected to a source of super-atmospheric pressure, a control chamber in said pressure responsive unit communicating with said variable pressure chamber, a valve unit axially slidable in said pressure responsive unit and having an axial bore therethrough communicating at one end with the atmosphere, an annular first valve carried by said valve unit and normally closing communication between said high pressure chamber and said control chamber, a second annular normally open valve carried by said valve unit adjacent the other end thereof, a manually operable unit coaxial with said valve unit and having a valve seat normally disengaged from and movable into engagement with said second valve to close said axial passage and to move said valve unit to open said first valve to supply super-atmospheric pressure to said control chamber, said valve seat outwardly of said second valve having a surface exposed to said control chamber whereby super-atmospheric pressures therein react against valve operating movement of said manually operable unit, and means responsive to super-atmospheric pressures above a predetermined point in said control chamber for transmitting such pressures to said manually operable unit to further react against valve operating movement of the latter.

5. A booster motor mechanism comprising a casing having a pressure responsive unit therein forming therewith a variable pressure chamber, a high pressure chamber in said pressure responsive unit connected to a source of super-atmospheric pressure, a control chamber in said pressure responsive unit communicating with said variable pressure chamber, a valve unit axially slidable in said pressure responsive unit and having an axial bore therethrough communicating at one end with the atmosphere, an annular first valve carried by said valve unit and normally closing communication between said high pressure chamber and said control chamber, a second annular normally open valve carried by said valve unit adjacent the other end thereof, a manually operable unit coaxial with said valve unit and having a valve seat normally disengaged from and movable into engagement with said second valve to close said axial passage and to move said valve unit to open said first valve to supply super-atmospheric pressure to said control chamber, said valve seat outwardly of said second valve having a surface exposed to said control chamber whereby super-atmospheric pressures therein react against valve operating movement of said manually operable unit, a pressure responsive device having a surface exposed to pressure in said control chamber and having a portion normally spaced from a portion of said manually operable unit, said pressure responsive device having a normal position engaging a portion of said pressure responsive unit, and a spring biasing said pressure responsive device to said normal position whereby an increase in pressure in said control chamber sufficient to overcome said spring will move said portion of said pressure responsive device into engagement with said portion of said manually operable unit to further react against valve operating movement of the latter.

6. A booster motor mechanism comprising a casing having a pressure responsive unit therein forming therewith a variable pressure chamber, a high pressure chamber in said pressure responsive unit connected to a source of super-atmospheric pressure, a control chamber in said pressure responsive unit communicating with said variable pressure chamber, a valve unit axially slidable in said pressure responsive unit and having an axial bore therethrough communicating at one end with the atmosphere, an annular first valve carried by said valve unit and normally closing communication between said high pressure chamber and said control chamber, a second annular normally open valve carried by said valve unit adjacent the other end thereof, a manually operable unit coaxial with said valve unit and having a valve seat normally disengaged from and movable into engagement with said second valve to close said axial passage and to move said valve unit to open said first valve to supply super-atmospheric pressure to said control chamber, said valve seat outwardly of said second valve having a surface exposed to said control chamber whereby super-atmospheric pressures therein react against valve operating movement of said manually operable unit, an annular diaphragm fixed at its inner periphery to said manually operable unit and at its outer periphery to said pressure responsive unit, a reaction washer fixed to said diaphragm and normally spaced from a portion of said manually operable unit, said diaphragm having a normal position engaging a portion of said pressure responsive unit, and a spring biasing said diaphragm to said normal position whereby, when super-atmospheric pressure in said control chamber increases to a predetermined point, said spring will be overcome and said reaction washer will engage said portion of said manually operable unit to further react against valve operating movement of the latter.

7. A booster motor mechanism comprising a casing having a pressure responsive unit therein dividing it to form a variable pressure chamber and a constant pressure chamber, the latter of which is open to the atmosphere, said pressure responsive unit having a portion projecting axially in one direction to constitute a member to be operated, a high pressure chamber in said pressure responsive unit connected to a source of super-atmospheric pressure, a control chamber in said pressure responsive unit communicating with said variable pressure chamber, a valve unit axially slidable in said axially projecting portion and having an axial bore therethrough communicating at one end with said constant pressure chamber, an annular first valve carried by said valve unit and normally closing communication between said high pressure chamber and said control chamber, a second annular normally open valve carried by said valve unit adjacent the other end thereof, a manually operable unit coaxial with said valve unit and projecting in the other direction from said axially projecting portion and having a valve seat normally disengaged from and movable into engagement with said second valve to close said axial passage and move said valve unit to open said first valve to supply super-atmospheric pressure to said control chamber, said valve seat outwardly of said second valve having a surface exposed to said control chamber whereby super-atmospheric pressures in the latter react against valve operating movement of said manually operable unit, and reaction means responsive to super-atmospheric pressures above a predetermined point in said control chamber to further react against valve operating movement of said manually operable unit.

8. A mechanism according to claim 7 wherein said reaction means comprises a pressure responsive device having a surface exposed to pressure in said control chamber and having a portion normally spaced from a portion of said manually operable unit, said pressure responsive device having a normal position engaging a portion of said pressure responsive unit, and a spring biasing said pressure responsive device to said normal position, whereby an increase in pressure in said control chamber to a predetermined point will overcome said spring to move said portion of said pressure responsive device into engagement with said portion of said manually operable unit to further react against valve operating movement of the latter.

9. A mechanism according to claim 7 wherein said reaction means comprises an annular diaphragm fixed at its inner periphery to said manually operable unit and at its outer periphery to said pressure responsive unit, a reaction washer fixed to said diaphragm and normally spaced from a portion of said manually operable unit, said diaphragm having a normal position engaging a portion of said pressure responsive unit, and a spring biasing said diaphragm to said normal position whereby, when super-atmospheric pressure in said control chamber increases to a predetermined point, said spring will be overcome and said reaction washer will engage said portion of said manually operable unit to further react against valve operating movement of the latter.

(References on following page)

References Cited in the file of this patent

UNITED STATES PATENTS

| | | | |
|---|---|---|---|
| 2,410,269 | Chouings | Oct. 29, | 1946 |
| 2,685,170 | Price | Aug. 3, | 1954 |
| 2,690,740 | Hupp | Oct. 5, | 1954 |
| 2,745,383 | Hupp | May 15, | 1956 |
| 2,796,154 | Stelzer | June 18, | 1957 |
| 2,862,365 | Ingres et al. | Dec. 2, | 1958 |
| 2,864,632 | Hupp | Dec. 16, | 1958 |
| 2,879,747 | Stelzer et al. | Mar. 31, | 1959 |
| 2,880,706 | Price | Apr. 7, | 1959 |
| 2,883,970 | Stelzer | Apr. 28, | 1959 |
| 2,883,971 | Myers | Apr. 28, | 1959 |